United States Patent
Ngatu et al.

(10) Patent No.: US 11,292,586 B2
(45) Date of Patent: Apr. 5, 2022

(54) CARBON NANOTUBE BASED HEAT SHIELD

(71) Applicant: GOODRICH CORPORATION, Charlotte, NC (US)

(72) Inventors: Grum Ngatu, Manchester, CT (US); Sreenivasa R Voleti, Farmington, CT (US); William P May, Tipp City, OH (US); Thomas P Filburn, Granby, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 262 days.

(21) Appl. No.: 15/979,118

(22) Filed: May 14, 2018

(65) Prior Publication Data

US 2019/0344880 A1    Nov. 14, 2019

(51) Int. Cl.
  *B64C 25/42*    (2006.01)
  *F16D 65/78*    (2006.01)
  *C04B 35/74*    (2006.01)
  *C08J 5/18*    (2006.01)

(52) U.S. Cl.
  CPC .............. *B64C 25/42* (2013.01); *C04B 35/74* (2013.01); *C08J 5/18* (2013.01); *F16D 65/78* (2013.01); *F16D 2065/785* (2013.01)

(58) Field of Classification Search
  CPC ... F16D 65/78; F16D 2065/785; B64C 25/42; C04B 35/74; C08J 65/78
  See application file for complete search history.

(56) References Cited

U.S. PATENT DOCUMENTS

| | | | |
|---|---|---|---|
| 5,114,818 A | * | 5/1992 | Yu ...................... G03G 15/2064 |
| | | | 399/330 |
| 8,722,171 B2 | | 5/2014 | Lashmore et al. |
| 9,005,755 B2 | | 4/2015 | Ledford et al. |
| 9,629,203 B1 | | 4/2017 | Downs, Jr. |
| 9,718,447 B2 | | 8/2017 | Waltz |
| 9,862,607 B2 | | 1/2018 | Zhang et al. |
| 2005/0224634 A1 | * | 10/2005 | Rea ........................ F16D 65/847 |
| | | | 244/10 |
| 2006/0061011 A1 | * | 3/2006 | Kikuchi .................... B60C 9/00 |
| | | | 264/289.3 |
| 2009/0272935 A1 | | 11/2009 | Hata et al. |
| 2010/0304182 A1 | | 12/2010 | Facchini et al. |

(Continued)

FOREIGN PATENT DOCUMENTS

| | | | |
|---|---|---|---|
| CN | 101648598 A | * | 2/2010 |
| GB | 2467442 | | 8/2010 |

(Continued)

OTHER PUBLICATIONS

CN-101648598A, Feng et al. abstract and drawing (Year: 2010).*

(Continued)

*Primary Examiner* — Melody M Burch
(74) *Attorney, Agent, or Firm* — Snell & Wilmer L.L.P.

(57) ABSTRACT

The present disclosure provides a heat shield. The heat shield may comprise a first layer comprising a first material, a second layer radially outward of the first layer comprising a second material, and a third layer radially outward of the second layer comprising a third material, wherein the first layer is coupled to the second layer by at least one post and at least one support extending from a radially outer surface of the first layer.

17 Claims, 8 Drawing Sheets

(56) References Cited

U.S. PATENT DOCUMENTS

2017/0210627 A1    7/2017  Jayasinghe et al.
2020/0130818 A1*   4/2020  Leiva ..................... F16D 55/36

FOREIGN PATENT DOCUMENTS

WO    2017136806    8/2017
WO    2017161258    9/2017
WO    2018027092    2/2018

OTHER PUBLICATIONS

CN-101648598 English Machine Translation (Year: 2010).*
European Patent Office, European Search Report dated Oct. 9, 2019 in Application No. 19173870.7.
Euroepan Patent Office, European Office Action dated Jun. 24, 2020 in Application No. 19173870.7.
European Patent Office, European Office Action dated Nov. 13, 2020 in Application No. 19173870.7.

* cited by examiner

CARBON NANOTUBE BASED HEAT SHIELD

FIELD OF THE DISCLOSURE

The present disclosure relates to heat shield systems and methods, and more particularly, to heat shield systems and methods for aircraft braking systems.

BACKGROUND OF THE DISCLOSURE

Aircraft should complete a successful Rejected Takeoff (RTO) without allowing a sustained tire fire for a time period thereafter. In that regard, heat shields may be used to tend to prevent such a fire.

SUMMARY OF THE DISCLOSURE

A heat shield may comprise a first layer comprising a first material, a second layer radially outward of the first layer comprising a second material, and a third layer radially outward of the second layer comprising a third material, wherein the first layer is coupled to the second layer by at least one post or at least one support extending from a radially outer surface of the first layer.

In various embodiments, the second material comprises a carbon nanotube sheet and the first material and third material comprise one of a steel or steel alloy material. The first material and third material may comprise a carbon nanotube sheet and the second material may comprise a steel or steel alloy material. The first material and third material may comprise a composite material and the second material may comprise a carbon nanotube sheet. The first material and third material may comprise a first carbon nanotube sheet comprising a first density of carbon nanotube fibers and the second material may comprise a second nanotube sheet comprising a second density of carbon nanotube fibers. The heat shield may further comprise a coating surrounding at least one of the first, second, or third layers. At least one of the first, second, or third layers may comprise a plurality of sublayers coupled together. The third layer may be coupled to the second layer by at least one post or at least one support extending from a radially inner surface of the third layer. The heat shield may comprise more than one radial structure along an axial length of the heat shield.

A brake assembly for an aircraft may comprise a heat shield comprising a first layer comprising a first material, a second layer radially outward of the first layer comprising a second material, and a third layer radially outward of the second layer comprising a third material, wherein the first layer is coupled to the second layer by at least one post or at least one support extending from a radially outer surface of the first layer.

In various embodiments, the third layer may be coupled to the second layer by at least one post or at least one support extending from a radially inner surface of the third layer. A radially inner surface of the first layer may be proximate to a brake stack and a radially outer surface of the third layer may be proximate to a wheel. The heat shield may comprise more than one radial structure along an axial length of the heat shield. The heat shield may comprise a first structure, a second structure, and a third structure, the first structure transitioning into the third structure at the second structure. The third layer may form a ramp and extend radially outward from the first structure to the third structure at the second structure.

A method of manufacturing a heat shield may comprise forming a first layer defining a cylindrical inner surface, forming a second layer radially outward of the first layer, forming a third layer radially outward of the second layer, coupling a radially outer surface of the first layer to a radially inner surface of the second layer by at least one post or at least one support extending from a radially outer surface of the first layer, and coupling a radially outer surface of the second layer to a radially inner surface of the third layer.

In various embodiments, coupling the radially outer surface of the second layer to the radially inner surface of the third layer comprises coupling the third layer to the second layer by at least one post or at least one support extending from the radially inner surface of the third layer. At least one of the first layer, second layer, and third layers comprises a carbon nanotube sheet. At least one of the first, second, or third layer comprises a plurality of sublayers coupled together. The method may further comprise applying a coating to at least one of the first, second, or third layers.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft braking systems. However, various aspects of the disclosed embodiments may be adapted for performance in a variety of other systems. As such, numerous applications of the present disclosure may be realized.

Various embodiments of the present disclosure may result in improved heat shielding between a brake stack and an aircraft tire during RTOs. Typically, when an RTO is initiated, the aircraft is traveling at a high rate of speed and aircraft brakes are activated in order to reduce the speed of the aircraft. The aircraft brakes convert kinetic energy to thermal energy through friction, leading to high temperatures in the brake stacks. The heat in a brake stack may be transferred to an aircraft tire, which increases the potential for the tire to ignite. Accordingly, heat shields may be desired to reduce heat transfer from a brake stack to a tire.

Figure 1A:
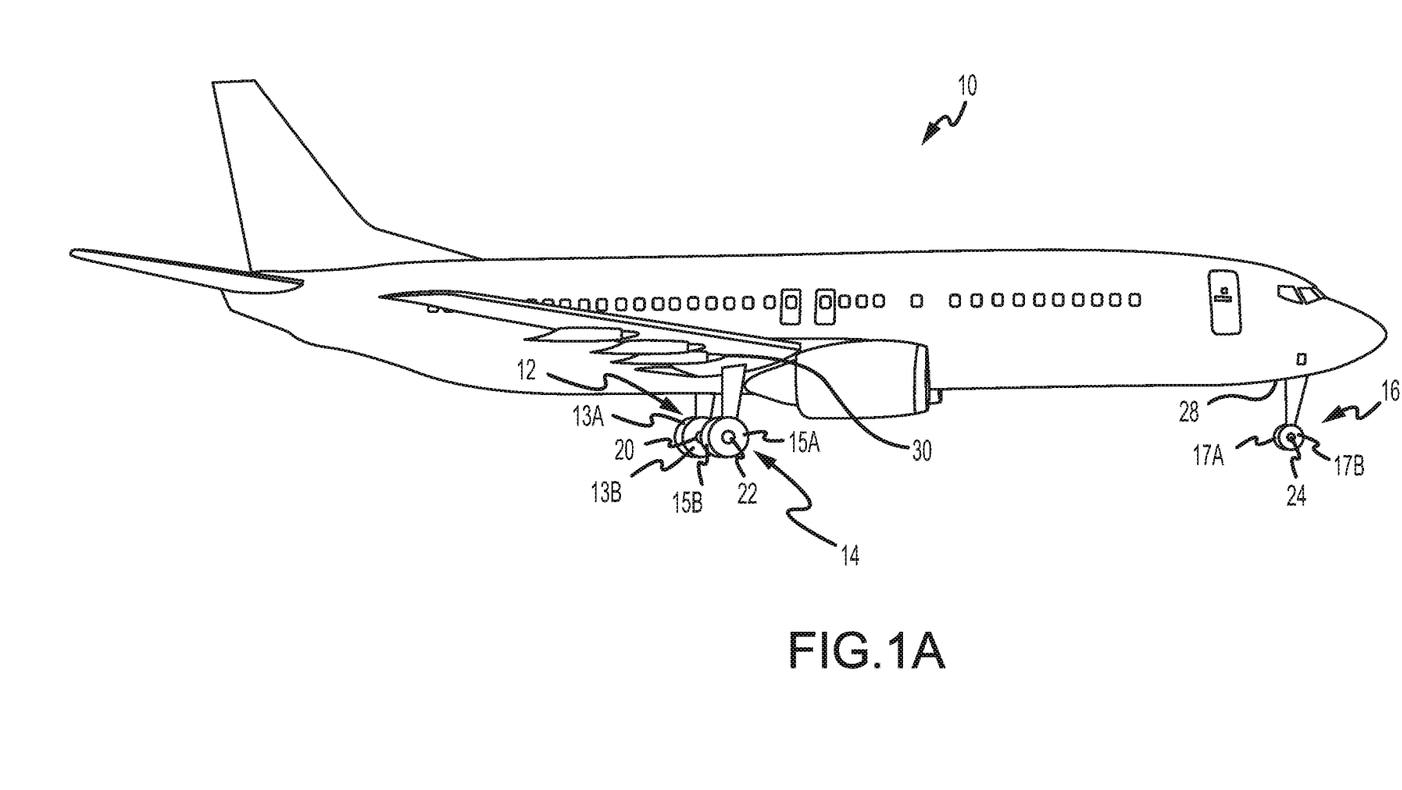
FIG. 1A illustrates an aircraft having a brake system comprising a heat shield, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Such brake systems of the aircraft 10 typically comprise a collection of assemblies, subsystems, and/or units that produce output signals for controlling the braking force and/or torque applied at one or more of the wheels 13A, 13B, 15A, 15B, 17A, 17B. Such brake systems typically communicate with the brakes of the left main landing gear 12, right main landing gear 14, and/or nose landing gear 16, and each brake is typically mounted to each wheel 13A, 13B, 15A, 15B, 17A, 17B in order to apply and release braking forces thereon. In various embodiments, the brakes of the aircraft 10 further include a non-rotatable wheel support, the wheels 13A, 13B, 15A, 15B, 17A, 17B mounted to the wheel support for rotation, and a brake disk stack.

Figure 1B:
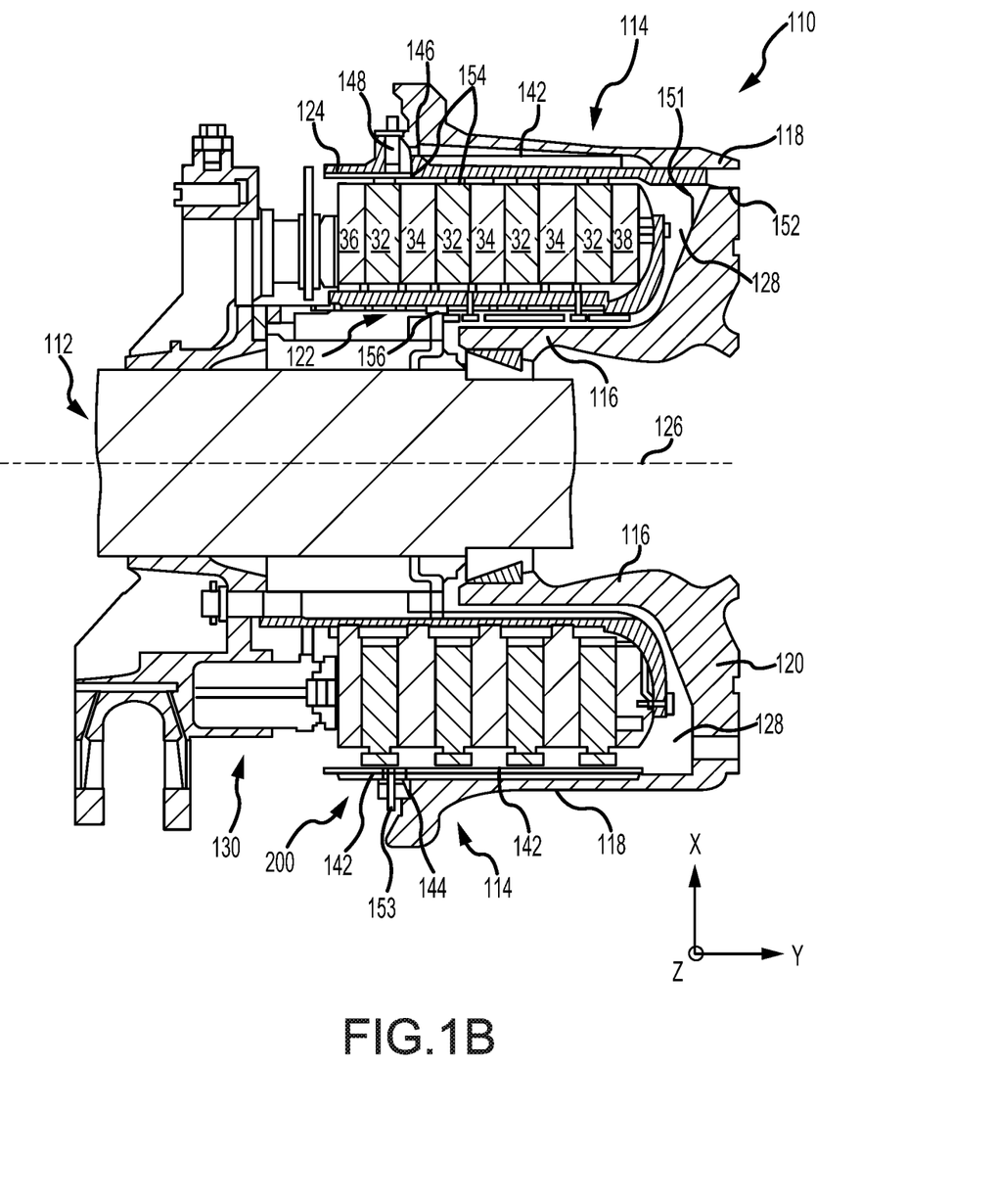
FIG. 1B illustrates a brake assembly comprising a heat shield, in accordance with various embodiments.

Referring now to FIG. 1B, a brake assembly 110 for mounting on an axle comprising a heat shield 200 is located on the aircraft 10 of FIG. 1A, in accordance with various embodiments. The brake assembly 110 for mounting on an axle typically comprises a bogie axle 112, a wheel 114 (e.g., the wheels 13A, 13B, 15A, 15B, 17A, 17B of FIG. 1-A) including a hub 116 and wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 200 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) are disposed in the wheel well recess 128 of the wheel well 118. The brake rotors 32 and brake stators 34 may be referred to collectively as the brake stack or heat sink. The brake rotors 32 are typically secured to the torque bars 124 for rotating with the wheel 114, while the brake stators 34 are typically engaged with the torque take-out assembly 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston, though pistons driven pneumatically and by electromechanical actuators are also contemplated herein. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from contact between the brake disks while braking the aircraft 10 of FIG. 1A.

Figure 2:
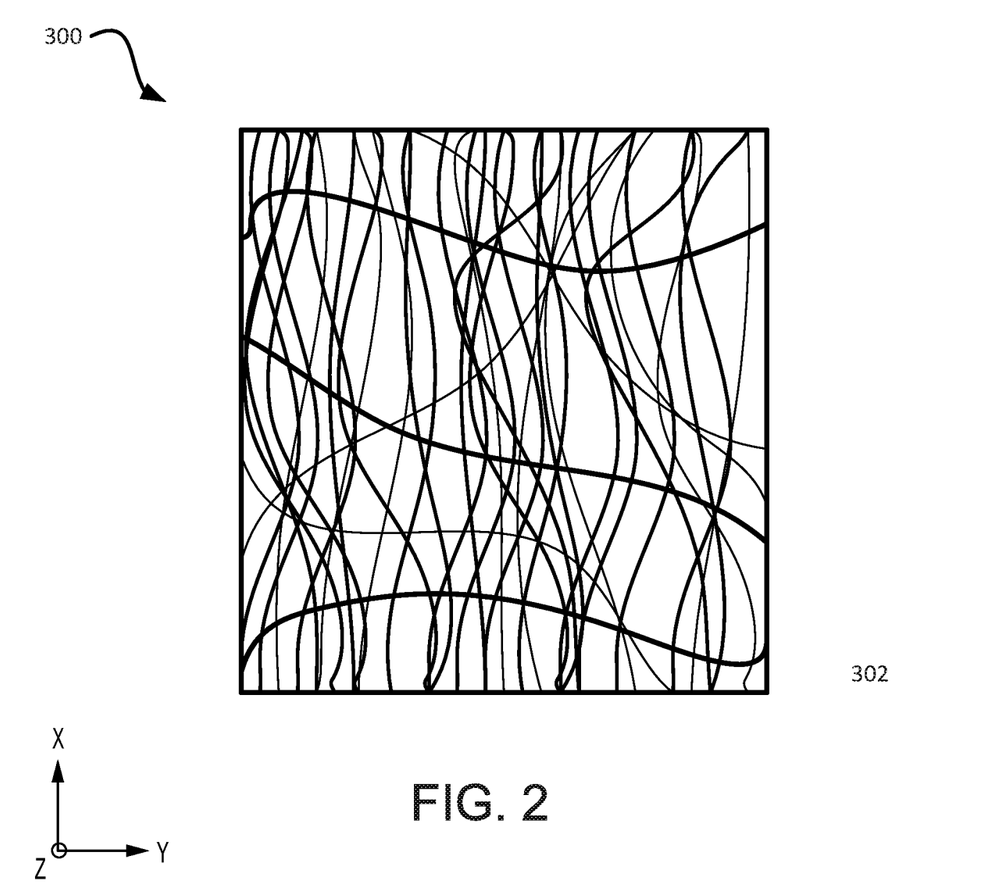
FIG. 2 illustrates a microscopic view of a carbon nanotube sheet, in accordance with various embodiments.

Referring now to FIG. 2, one or more layers of heat shield 200 may comprise a carbon nanotube sheet, in accordance with various embodiments. FIG. 2 illustrates a microscopic view of an exemplary carbon nanotube sheet 300, such as a carbon nanotube sheet or tape manufactured by Nanocomp Technologies, Inc. and sold under the trademark Miralon®. Carbon nanotube sheet 300 may be a nonwoven nanotube sheet which may comprise a plurality of carbon nanotube fibers 302. Carbon nanotube fibers 302 may be aligned in a single direction, bi-directionally, multi-directionally, or randomly dispersed. Carbon nanotube fibers 302 may be in the range of hundreds of microns thick and millimeters long. Carbon nanotube fibers 302 may be grown in a tube furnace using iron-based catalyst and organic precursors. The catalyst and a feed-gas may be force fed on one end of a plate and carbon nanotube fibers 302 may emerge on the opposite end. The carbon nanotube fibers 302 may be collected on a rotating drum to make flat sheets or, alternatively, the emerging carbon nanotube fiber 302 may be spun directly into continuous yarns, which may be plied or braided to create a carbon nanotube sheet. In this way, carbon nanotube fibers 302 may together form a carbon nanotube sheet 300 of intertangled carbon nanotube fibers 302. Other manufacturing methods and techniques may be desired. Among other properties, carbon nanotube sheets may exhibit high in-plane thermal conductivity (in this instance, along the x-y plane) and low through-plane thermal conductivity (in this instance, through the x-y plane in the z-direction) relative to traditional heat shield materials. For example, carbon nanotube sheet 300 may comprise an in-plane thermal conductivity between approximately 10 and 50 w/mK, between approximately 20 and 40 w/mK, or approximately 30 w/mK. Carbon nanotube sheet 300 may comprise a through-plane thermal conductivity between approximately 0.01 and 0.09 w/mK, between approximately 0.03 and 0.07 w/mK, or approximately 0.05 w/mK. Carbon nanotube sheet 300 may also be relatively light in weight and small in volume when compared to alternative heat shield materials, thereby decreasing fuel costs in associated aircraft and decreasing space occupied by the heat shield in the aircraft wheel. In various embodiments, a bulk density of carbon nanotube sheet 300 may be between approximately 0.1 and 0.7 grams per cubic centimeter, between approximately 0.2 and 0.6 grams per cubic centimeter, or between approximately 0.3 and 0.5 grams per cubic centimeter.

Moving on and with reference to FIGS. 3A, 3B, 3C, and 3D, multiple cross-sectional views of heat shields comprising one or more layers of carbon nanotube sheets are illustrated, in accordance with various embodiments. Heat shields 310, 320, 330 and 340 may comprise a plurality of heat shield layers. At least one layer may comprise a carbon nanotube sheet, similar to carbon nanotube sheet 300. The plurality of heat shield layers may be positioned radially relative to each other to form heat shields 310, 320, 330 and 340. As will be discussed further below, various embodiments of the present disclosure allow heat shields 310, 320, 330 and 340 comprising one or more carbon nanotube sheets to provide greater resistance to radiative heat transfer from the brake stack to wheel well 118, while also minimizing the weight and volume of heat shields 310, 320, 330 and 340.

Figure 3A:
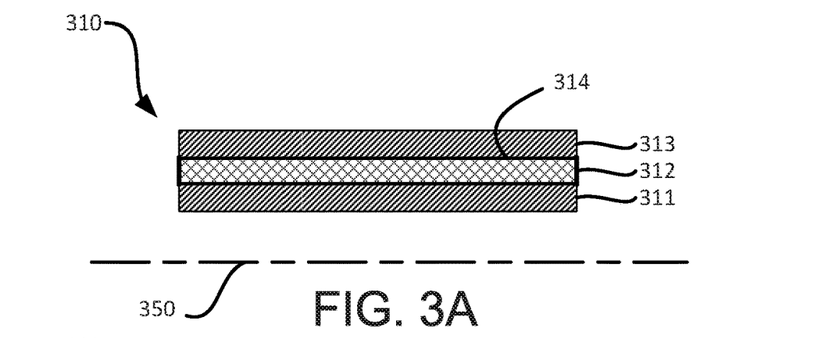
FIGS. 3A, 3B, 3C and 3D illustrate various cross-sectional embodiments of heat shields comprising carbon nanotube sheets, in accordance with various embodiments.

For example, with reference to FIG. 3A, a heat shield 310 may comprise cylindrical structure defining an axis 350. Axis 350 may extend through a center portion of heat shield 310 and may be coaxial with wheel rotational axis 126. Heat shield 310 may comprise at least three layers. In various embodiments, heat shield 310 may comprise a first layer 311, a second layer 312, and a third layer 313. First layer 311 may be positioned radially inward of second layer 312 which may positioned radially inward of third layer 313. First layer 311 may form a cylindrical inner surface of heat shield 310 and be proximate to a brake stack. Third layer 313 may form a cylindrical outer surface of heat shield 310 and be proximate to wheel well 118. In various embodiments, layers 311, 312, and 313 may be coupled together such that the layers of material are in direct contact with each other along an entire surface. For example, in various embodiments, heat shield 310 may be formed such that a radially outer surface of second layer 312 is coupled directly to a radially inner surface of third layer 313 and a radially inner surface of second layer 312 is coupled directly to a radially outer surface of first layer 311. In various embodiments, an air layer or other material may exist between the various layers such that the layers are not in direct contact with each other along an entire surface.

In various embodiments, one or more of layers 311, 312, and 313 may comprise multiple sublayers layers coupled together. For example, one or more layer 311, 312, and 313 may comprise multiple sublayers layers of carbon nanotube sheets coupled together to form a single layer thicker than each of the individual carbon nanotube sheet sublayers. In various embodiments, one or more of the layers may comprise a chemical coating 314 surrounding a perimeter of the layer. For example, in various embodiments, coating 314 of one or more layers 311, 312, and 313 may comprise a thermally insulating material such as a yttria-stabilized zirconia material, rare-earth zirconate material, rare earth oxide material, metal-glass composite material or other thermally insulating material. Various coatings 314 may be utilized to achieve desired electrical and mechanical properties. Coating 314 may shield one or more layers 311, 312, and 313 from heat developing near the brake stack during braking, thereby extending life of one or more layers 311, 312, and 313. Coating 314 may also bind multiple sublayers together in embodiments in which one or more layers 311, 312, and 313 comprise multiple sublayers.

With further reference to FIG. 3A, first layer 311, second layer 312, and third layer 313 may comprise different materials, in accordance with various embodiments. First layer 311 and third layer 313 may comprise a different material than second layer 312. In various embodiments, first layer 311 and/or third layer 313 may comprise a metal material such as steel, aluminum, titanium, or an alloy of any of the foregoing. Second layer 312 may comprise a carbon nanotube sheet, similar to carbon nanotube sheet 300 discussed with reference to FIG. 2. First layer 311 and/or third layer 313 comprising a metal material may provide structural integrity to heat shield 310 and may increase the amount of time it takes for a fire developing near the brake stack to burn through heat shield 310 to wheel well 118. Second layer 312, comprising a carbon nanotube sheet, may further help to prevent fires from spreading from the brake stack to the wheel well 118. As previously stated, carbon nanotube sheets tend to exhibit high in-plane thermal conductivity and low through-plane thermal conductivity. As a result, second layer 312 comprising a carbon nanotube sheet may evenly distribute heat along an axial surface (in the y-z plane) of heat shield 310 while resisting heat transfer in a radial direction (in the x-direction) from the brake stack to wheel well 118. In this way, heat shield 310 may provide greater resistance to radiative heat transfer when compared with traditional heat shields, thereby increasing the time it take a fire developing at or near the break stack to spread to wheel well 118 and other portions of the wheel.

Figure 3B:
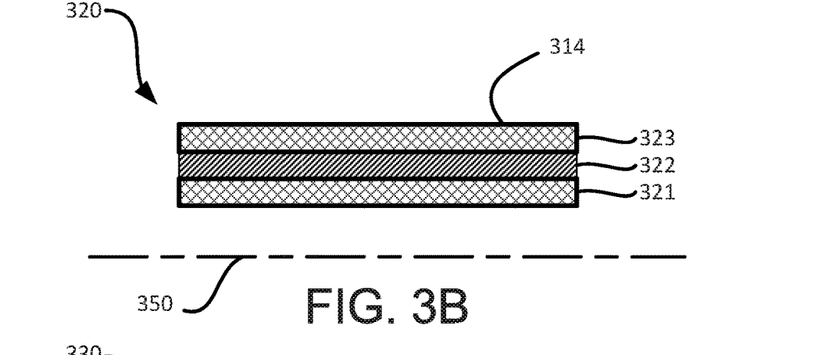

With reference to FIG. 3B, an alternative heat shield structure is illustrated, in accordance with various embodiments. Similar to heat shield 310, heat shield 320 may comprise at least three layers, for example, first layer 321, second layer 322, and third layer 323. First layer 321, second layer 322, and third layer 323 may comprise different materials. First layer 321 and third layer 323 may comprise a different material than second layer 322. In various embodiments, first layer 321 and/or third layer 323 may comprise a carbon nanotube sheet similar to carbon nanotube sheet 300. Second layer 322 may comprise a metal material such steel, aluminum, titanium, or an alloy of any of the foregoing. First layer 321 and/or third layer 323 comprising a carbon nanotube sheet may comprise a relatively high in-plane conductivity and low through-plane thermal conductivity when compared with traditional heat shield materials. Accordingly, heat shield 320 comprising multiple carbon fiber sheets may result in a more even heat distribution along an axial surface of heat shield 320, while resulting in a greater resistance to radiative heat transfer in a radial direction. A volume and weight of heat shield 320 may further be reduced due to the incorporation of multiple carbon nanotube sheet layers.

Figure 3C:
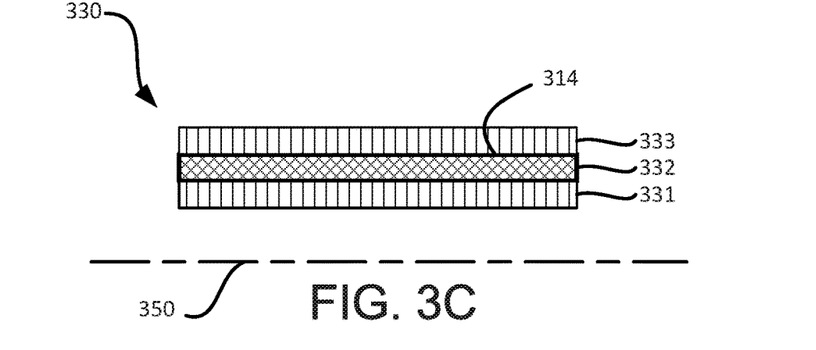

With reference to FIG. 3C, an alternative heat shield structure is illustrated, in accordance with various embodiments. Similar to heat shields 310, 320, heat shield 330 may comprise at least three layers, for example, first layer 331, second layer 332, and third layer 333. First layer 331, second layer 332, and third layer 333 may comprise different materials. First layer 331 and third layer 333 may comprise a different material than second layer 332. In various embodiments, first layer 331 and/or third layer 333 may comprise a composite material such as a metal-matrix composite (MMC) or ceramic-matrix composite (CMC). Second layer 332 may comprise a carbon nanotube sheet, similar to carbon nanotube sheet 300 discussed with reference to FIG. 2. First layer 331 and/or third layer 333 comprising composite materials may provide structural integrity and thermal resistance to radiative heat transfer while reducing the weight of heat shield 330. Accordingly, heat shield 330 comprising composite materials combined with carbon nanotube sheets may effectively reduce fuel costs when compared with other heat shields comprising alternative materials.

Figure 3D:
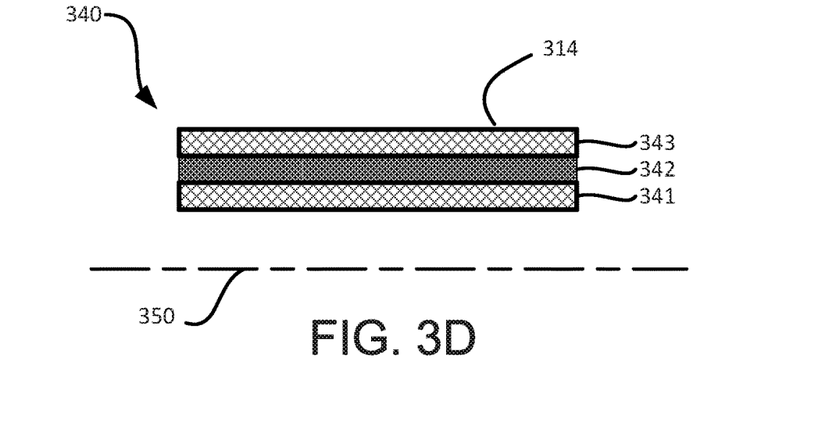

With reference to FIG. 3D, an alternative heat shield structure is illustrated, in accordance with various embodiments. Similar to heat shields 310, 320, 330, heat shield 340 may comprise at least three layers, for example, first layer 341, second layer 342, and third layer 343. First layer 341, second layer 342, and third layer 343 may comprise different materials. First layer 341 and third layer 343 may comprise a different material than second layer 342. In various embodiments, first layer 341 and/or third layer 343 may comprise a first carbon nanotube sheet. Second layer 342 may comprise a second carbon nanotube sheet. The carbon nanotube sheet of second layer 342 may be similar to the carbon nanotube sheet of the first layer 341 and/or third layer 343 except that the carbon nanotube sheet of the second layer 342 may comprise a higher or lower density of carbon nanotube fibers than the carbon nanotube sheet of first layer 341 and third layer 343. First layer 341 and/or third layer 343 comprising carbon nanotube sheets comprising a greater or lesser density of carbon nanotube fibers may provide additional thermal resistance to heat in the radial direction and further limit the volume and weight associated with heat shield 340.

Figure 4:
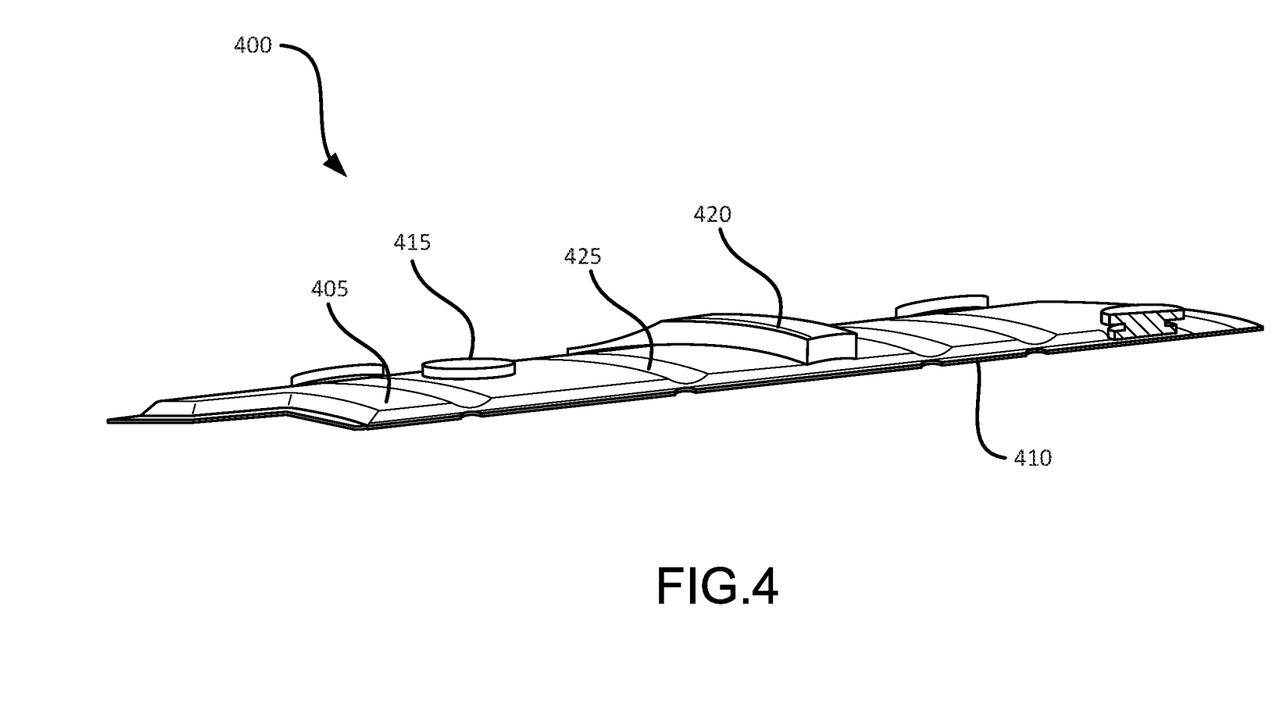
FIG. 4 illustrates a cross-sectional view of a layer of a heat shield, in accordance with various embodiments.

Moving on and with reference to FIG. 4, an exemplary first layer 400 of a heat shield is illustrated, in accordance with various embodiments. First layer 400 may form a cylindrical inner surface at a radially inner surface 410 of first layer 400 and may be configured to be coupled to and support a radially inner surface of a second layer (not illustrated) by radially outer surface 405. For example, radially outer surface 405 of first layer 400 may comprise one or more posts 415 integral with and extending from radially outer surface 405 of first layer 400. Posts 415 may extend in a radial direction from radially outer surface 405 and be configured to couple first layer 400 to the second layer such that contact between first layer 400 and the second layer is minimized (e.g., see FIG. 7). For example, in various embodiments, posts 415 may comprise a cylinder or other suitable shape for interfacing with the second layer. In various embodiments, posts 415 may be in the form of a prism comprising a triangular, rectangular, square, or other suitably-shaped face. In various embodiments, posts 415 may be positioned near one or both axial ends of first layer 400. Posts 415 may be spaced apart from other posts 415 axially and circumferentially such that posts 415 provide even support for the second layer, while minimizing contact between first layer 400 and the second layer.

First layer 400 may further comprise one or more supports 420 integral with and extending from radially outer surface 405 of first layer 400. In various embodiments, supports 420 may be positioned near an axial center of first layer 400 such that supports 420 are positioned between posts 415. Similar to posts 415, supports 420 may extend in a radial direction from outer surface 405 such that supports 420 may help couple first layer 400 to the second layer (e.g., see FIG. 7). In various embodiments, each support 420 may be in the form of a continuous ring extending circumferentially around first layer 400, however supports 420 are not limited in this regard. In various embodiments, first layer 400 may comprise only posts 415, only supports 420, or a combination of posts 415 and supports 420 to couple first layer 400 to the second layer. Posts 415 and/or supports 420 may be coupled to a radially inner surface of a second layer such that contact between first layer 400 and the second layer is minimized. In this way, air pockets may be formed in the areas between posts 415, supports 420, first layer 400 and second layer. In various embodiments, a similar structure may exist between the second layer and the third layer. Air pockets may result in reduced convective heat transfer between the layers when compared with heat shields lacking air pockets between the various layers. Accordingly, the likelihood a fire developing at or near the brake stack spreads to the wheel well and/or other portions of the wheel may be reduced. First layer 400 may further comprise one or more channels 425 at radially outer surface 405 and/or radially inner surface 410 to increase the volume of air between first layer 400 and the second layer. Channels 425 may further serve to decease the weight of first layer 400.

Figure 7:
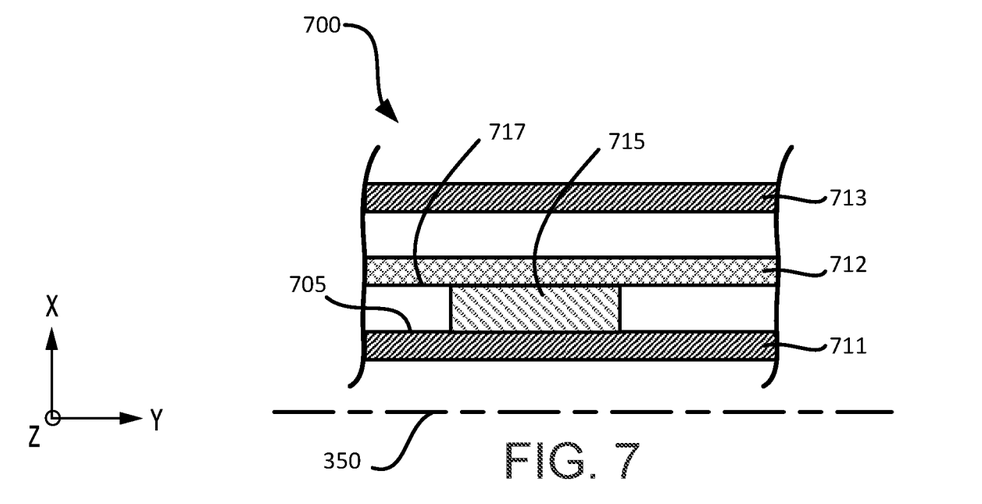
FIG. 7 illustrates a cross-sectional embodiment of a heat shield comprising carbon nanotube sheets and a support, in accordance with various embodiments.

With reference to FIG. 7, a heat shield structure is illustrated, in accordance with various embodiments. Similar to heat shields 310, 320, 330, heat shield 700 may comprise at least three layers, for example, first layer 711, second layer 712, and third layer 713. Heat shield 700 comprises a support 715 (e.g., similar to post 415 or support 420) extending in a radial direction from outer surface 705 such that support 715 may help couple first layer 711 to second layer 712. Support 715 may extending in a radial direction from radially inner surface 717 of second layer 712 such that contact between first layer 711 and second layer 712 is minimized. In this manner, support 715 may terminate at radially inner surface 717. In this manner, support 715 may terminate at radially outer surface 705.

Figure 5:
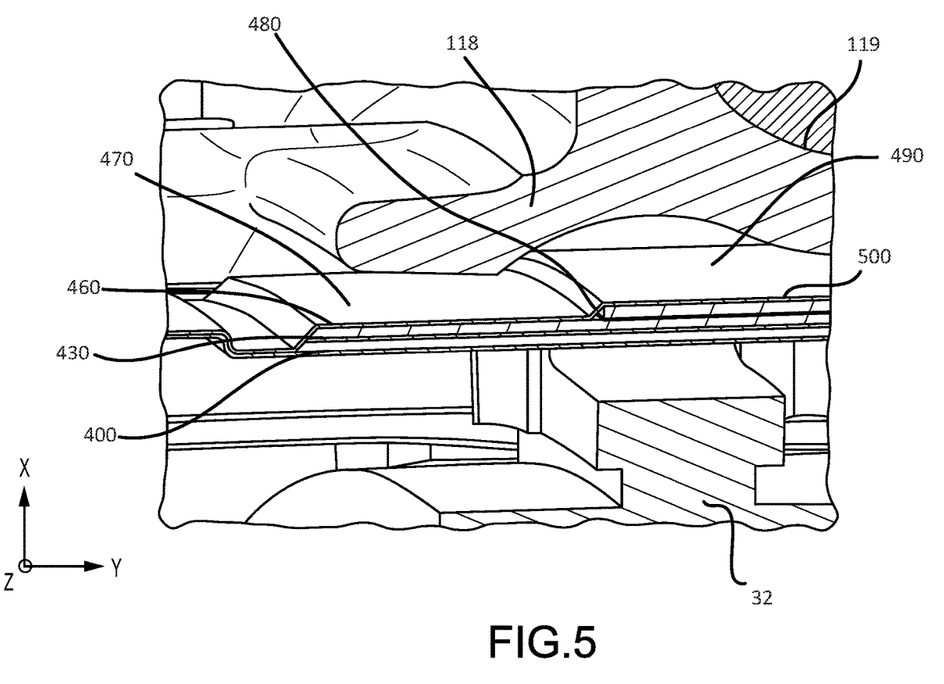
FIG. 5 illustrates an expanded cross-sectional view of a heat shield attached to a brake assembly, in accordance with various embodiments.

Referring now to FIG. 5, first layer 400 may form a portion of heat shield 500, in accordance with various embodiments. First layer 400 may form a cylindrical inner surface of heat shield 500 and be positioned proximate to a brake stack. Similar to heat shields 310, 320, 330, and 340, heat shield 500 may comprise at least three layers. For example, heat shield 500 may comprise first layer 400, second layer 430 radially outward of first layer 400, and third layer 460 radially outward of second layer 430. Third layer 460 may be positioned proximate to the wheel. In various embodiments at least one of the first layer 400, second layer 430, or third layer 460 may comprise a carbon nanotube sheet, similar to carbon nanotube sheet 300. First layer 400, second layer 430, and third layer 460 may be coupled directly to each other via posts (for example, posts 415 with momentary reference to FIG. 4) and supports 420 (for example, supports 420 with momentary reference to FIG. 4).

In various embodiments, first layer 400, second layer 430, and/or third layer 460 may be separated by additional layers. For example, in various embodiments, each of the first layer 400, second layer 430, and/or third layer 460 may be separated by an insulation layer, foil layer, and/or air layer.

In various embodiments, heat shield 500 may comprise one or more structures along an axial length (in the y-direction). For example, in various embodiments, heat shield 500 may comprise a first structure 470, a second structure 480, and a third structure 490. First structure 470 may transition into third structure 490 through second structure 480. In various embodiments, first structure 470 may comprise at least first layer 400, second layer 430, and third layer 460. At second structure 480, third layer 460 may form a ramp and extend radially outward (in the x-direction) and transition into third structure 490 to permit additional materials between second layer 430 and third layer 460. In various embodiments, third structure 490 may include an additional insulation layer, foil layer, and/or other layer when compared with first structure 470. Third structure 490 comprising additional layers may provide additional resistance to radiative heat transfer when compared with first structure 470 and/or second structure 480.

With continued reference to FIG. 5, heat shield 500 may be strategically positioned in an axial direction, in accordance with various embodiments. Third structure 490 may be axially positioned along the y-axis such that it is positioned between the brake stack and wheel well 118 in areas that may be more likely to develop a tire fire. For example, third structure 490 may be positioned such that it is radially inward and axially aligned with bead seat 119 of wheel well 118. Bead seat 119 may be more likely to cause a tire to ignite due to the close proximity of bead seat 119 to the tire, which may result in greater conductive heat transfer between bead seat 119 and the tire.

Figure 6:
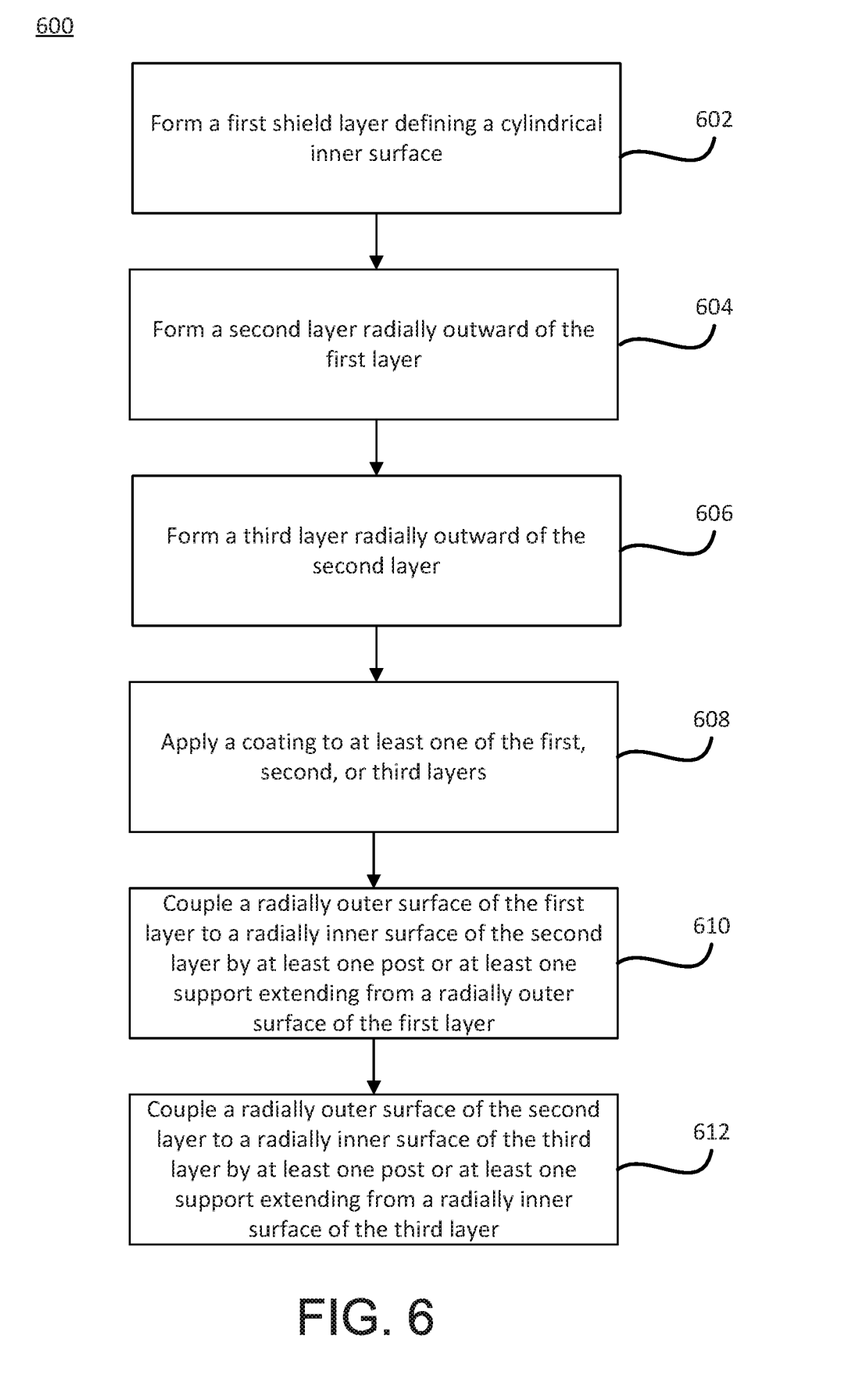
FIG. 6 illustrates a method of manufacturing a heat shield, in accordance with various embodiments.

A block diagram illustrating a method 600 for manufacturing a heat shield is illustrated in FIG. 6, in accordance with various embodiments. Method 600 may comprise forming a first layer defining a cylindrical inner surface (Step 602). The method may further comprise forming a second layer radially outward of the first layer (Step 604). The method may further comprise forming a third layer radially outward of the second layer (Step 606). The method may further comprise applying a coating to at least one of the first, second, or third layers (Step 608). The method may further comprise coupling a radially outer surface of the first layer to a radially inner surface of the second layer by at least one post or at least one support extending from a radially outer surface of the first layer (Step 610). The method may further comprise coupling a radially outer surface of the second layer to a radially inner surface of the third layer by at least one post or at least one support extending from a radially inner surface of the third layer (Step 612).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield comprising,
a first layer comprising a first material;
a second layer radially outward of the first layer comprising a second material;
a plurality of supports extending between and terminating at a radially outer surface of the first layer and a radially inner surface of the second layer, wherein each support is selected from the group consisting of a post or a continuous ring extending circumferentially around the first layer;
an air pocket that extends between the radially outer surface of the first layer and the radially inner surface of the second layer and between an adjacent pair of supports of the plurality of supports; and
a third layer radially outward of the second layer comprising a third material;
wherein the second material comprises a carbon nanotube sheet; and
wherein the first material and the third material are either of a first configuration or a second configuration, the first configuration being that the first material and third material comprise one of a steel or steel alloy material, the second configuration being that the first material and third material comprise a composite material.

2. A brake assembly for an aircraft comprising the heat shield of claim 1, wherein a radially inner surface of the first layer is proximate to a brake stack and wherein a radially outer surface of the third layer is proximate to a wheel.

3. The heat shield of claim 1, further comprising a coating surrounding at least one of the first, second, or third layers.

4. The heat shield of claim 1, wherein each support of the plurality of supports is integral with the first layer.

5. The heat shield of claim 1, wherein the third layer is coupled to the second layer by a second plurality of supports extending from a radially inner surface of the third layer.

6. The heat shield of claim 1, wherein the first layer further comprises a plurality of channels on the radially outer surface of the first layer.

7. A brake assembly for an aircraft comprising, a heat shield comprising,
- a first layer comprising a first material;
- a second layer radially outward of the first layer comprising a second material;
- a plurality of supports extending between and terminating at a radially outer surface of the first layer and a radially inner surface of the second layer, wherein each support is selected from the group consisting of a post or a continuous ring extending circumferentially around the first layer;
- an air pocket that extends between the radially outer surface of the first layer and the radially inner surface of the second layer and between an adjacent pair of supports of the plurality of supports; and
- a third layer radially outward of the second layer comprising a third material;
- wherein the first material and third material comprise a carbon nanotube sheet and the second material comprises a steel or steel alloy material.

8. The brake assembly of claim 7, wherein the third layer is coupled to the second layer by a second plurality of supports extending from a radially inner surface of the third layer.

9. The brake assembly of claim 7, wherein a radially inner surface of the first layer is proximate to a brake stack and wherein a radially outer surface of the third layer is proximate to a wheel.

10. The brake assembly of claim 7, wherein each support of the plurality of supports is integral with the first layer.

11. The brake assembly of claim 7, wherein the first layer further comprises a plurality of channels on the radially outer surface of the first layer.

12. A heat shield comprising,
- a first layer comprising a first material;
- a second layer radially outward of the first layer comprising a second material;
- a plurality of supports extending between and terminating at a radially outer surface of the first layer and a radially inner surface of the second layer, wherein each support is selected from the group consisting of a post or a continuous ring extending circumferentially around the first layer;
- an air pocket that extends between the radially outer surface of the first layer and the radially inner surface of the second layer and between an adjacent pair of supports of the plurality of supports; and
- a third layer radially outward of the second layer comprising a third material;
- wherein the first material and third material comprise a first carbon nanotube sheet comprising a first density of carbon nanotube fibers and the second material comprises a second nanotube sheet comprising a second density of carbon nanotube fibers.

13. A brake assembly for an aircraft comprising the heat shield of claim 12, wherein a radially inner surface of the first layer is proximate to a brake stack and wherein a radially outer surface of the third layer is proximate to a wheel.

14. The heat shield of claim 12, further comprising a coating surrounding at least one of the first, second, or third layers.

15. The heat shield of claim 12, wherein each support of the plurality of supports is integral with the first layer.

16. The heat shield of claim 12, wherein the third layer is coupled to the second layer by a second plurality of supports extending from a radially inner surface of the third layer.

17. The heat shield of claim 12, wherein the first layer further comprises a plurality of channels on the radially outer surface of the first layer.

* * * * *